United States Patent Office 3,085,096
Patented Apr. 9, 1963

3,085,096
PREPARATION OF CIS-4-CYCLOHEXENE-1,2-DI-CARBOXYLIC ACID ANHYDRIDE
Ralph O. Kerr, Houston, and William G. Bowman, Pasadena, Tex., assignors to Petro-Tex Chemical Corporation, Houston, Tex., a corporation of Delaware
No Drawing. Filed May 31, 1961, Ser. No. 113,651
4 Claims. (Cl. 260—346.6)

This invention relates to an improved process for the preparation of cis-4-cyclohexene-1,2-dicarboxylic acid anhydride (tetrahydrophthalic anhydride). According to this invention cis-4-cyclohexene-1,2-dicarboxylic acid anhydride is formed by the reaction of butadiene-1,3 with maleic anhydride in a particular manner.

The reaction between butadiene-1,3 and maleic anhydride is a well known reaction to produce cis-4-cyclohexene-1,2-dicarboxylic acid anhydride. This reaction has been described in publications and patents such as U.S. 1,944,731. However, some difficulties have been encountered in the development of a commercial process to produce a high purity resin. One of the principal uses of cis-4-cyclohexene-1,2-dicarboxylic acid anhydride is in the preparation of alkyd resins for coating formulations. For such a use a product is desired which has high purity, low ash value, and low color. According to this invention a process has been discovered which will produce high purity cis-4-cyclohexene-1,2-dicarboxylic acid anhydride by a simple, trouble-free process.

The process of this invention comprises reacting under particular conditions maleic anhydride with butadiene-1,3 in a process whereby the maleic anhydride is present in a molten state and the butadiene-1,3 is fed into the vapor phase above the maleic anhydride. No solvent is present and the reaction is conducted at relatively low pressures.

Maleic anhydride of high purity is either melted into a dry, clean reaction vessel, or more preferably, the molten maleic anhydride is poured into the reaction vessel. Temperatures of about 53 to 75° C. and preferably from about 55 to 65° C. are used to melt the maleic anhydride. Means for stirring the molten maleic anhydride are then used to agitate the maleic anhydride. Butadiene-1,3 is then fed in the vapor space above the maleic anhydride. An inert gas such as nitrogen may be purged through the reactor during the run. The reaction begins immediately without an induction period. As the reaction goes to completion, the temperature should be carefully controlled. The temperature is normally raised at an average between 5 and 35° C. per hour and preferably at the rate of 10 to 20° C. per hour. The temperature is raised at the specified rate until the temperature of the reaction mixture reaches a temperature of about 100 to 125° C. and generally a temperature in the range of about 104 to 114° C. After the temperature has reached this upper range, the reaction is held at this temperature for about 5 to 30 minutes to insure complete reaction. The product from the reactor is high purity cis-4-cyclohexene-1,2-dicarboxylic acid anhydride which needs no further purification and may be sent directly to the bagging unit.

The pressure during the reaction is generally around atmospheric although pressures from about 10 inches vacuum to about 35 p.s.i.g. may be used. Ordinarily the reaction is conducted at about 0 to 20 p.s.i.g. A positive pressure may be maintained by a regulated flow of nitrogen or other inert gas into the system.

Agitators for the reaction may be a variety of types such as propellers, paddles, turbines, intermeshing fingers, gate type paddles, horseshoe mixers and double motion paddles. Best results have been obtained by employing agitators such as a paddle, propeller or turbine located in the liquid-gaseous interface of the reaction mixture. The agitator may be periodically moved upward during the run as the liquid level increases due to the formation of cis-4-cyclohexene-1,2-dicarboxylic acid anhydride or more than one agitator may be placed on the shaft so that there will always be an agitator near the surface of the liquid.

The butadiene-1,3 fed to the reactor should contain at least 95 and preferably at least about 97 weight percent butadiene. It has been found that traces of butenes or butane may be tolerated but large quantities should be avoided. Similarly, the maleic anhydride used should be of high purity and should contain at least 95 and more generally at least about 98 weight percent maleic anhydried. When lower purity maleic anhydride or butadiene-1,3 are used, cis-4-cyclohexene-1,2-dicarboxylic acid anhydride of higher color values as measured by Hazen [1] color value are produced. These higher colors do not result simply from the additive color values introduced by the impurities in the maleic anhydride and butadiene-1,3. For example, if a colorless mixture of 90 weight percent butadiene plus 10 weight percent butene is used the cis-4-cyclohexene-1,2-dicarboxylic acid anhydride produced has poor color even though the butene impurity was colorless. Impurities such as water vapor or vinyl acetylene in the reaction mixture result in an inferior product.

The butadiene is fed at an average rate between .01 and .10 mol of butadiene per mol of maleic anhydride originally charged per degree centigrade rise in reaction temperature. Deviations from this feed rate may produce cis-4-cyclohexene-1,2-dicarboxylic acid anhydride which is off specification. This butadiene feed rate will generally correspond to a feed rate of from 20 to 50 mols of butadiene per 100 mols of maleic anhydride originally charged per hour. The total number of mols of butadiene fed will be equal to or slightly in excess of the number of mols of maleic anhydride and oridinarily from 1.0 to 1.4 mols of butadiene per mol of maleic anhydride. After all of the butadiene has been fed, the reaction mixture is maintained at the upper temperature of about 100 to 120° C. for about 5 to 30 minutes as mentioned above.

By following the process of this invention, high purity, white, crystalline, cis-4-cyclohexene-1,2-dicarboxylic acid anhydride with color values of from about 10 to 30 Hazen value and having the correct melting point range may be produced. The resulting cis - 4 - cyclohexene-1,2-dicarboxylic acid anhydride has a purity of 99 weight percent or greater with less than 150 parts per million of maleic anhydride and less than 15 parts per million of ash. Not only is high grade cis-4-cyclohexene-1,2-dicarboxylic acid anhydride produced but the difficulties and expense of a process such as where a solvent is used are avoided. The product has many uses, for example, the glycerol esters are valuable alkyd resins.

The following examples are intended to be illustrative only, rather than limiting of the invention.

The apparatus used was a 3 liter three-neck glass flask equipped with a rapid stirring device. The flask was equipped with an inlet line for the butadiene flow, which line did not dip into the reaction mixture. Also, the reaction flask had a nitrogen purge line. On the exit gaseous line a mercury trap was provided to maintain a slight positive gas pressure on the flask. The reaction flask was immersed in a temperature control bath.

The flask was purged with nitrogen gas and the solid maleic anhydride was then charged to the flask. The maleic anhydride was melted by heating to about 60° C.

[1] An arbitrarily selected system of color units used to describe the color in relation to platinum-cobalt standards. This test is described in Official and Tentative Methods of Analysis of the Association of Official Agricultural Chemists, Sixth Edition, 1945, p. 629, para. 37.3. The higher numbers represent darker colors.

While the maleic anhydride was being melted, the flask was purged with nitrogen gas. After the maleic anhydride had been melted, gaseous butadiene was flowed into the flask at the indicated rate. The exothermic reaction was controlled by circulating water through a cooling coil in the bath surrounding the flask. As the reaction proceeded, essentially all of the butadiene fed was reacted with the maleic anhydride as it was being fed. The reactions went substantially to 100 percent conversion, and this point is indicated by an abrupt increase in the gas flow from the reaction vessel. The butadiene flow is continued at a reduced rate from about 5 to 30 minutes to insure complete reaction.

Example 1

Maleic anhydride was charged to the reaction flask in an amount of 15.15 mols. The maleic anhydride had a freezing point of 52.72° C. After the maleic anhydride was melted, the butadiene flow was begun at an average rate of about .06 mol per minute. The butadiene feed was controlled to give an average rate of .029 mol of butadiene per mol of maleic anhydride charged per degree centigrade rise in temperature. The butadiene fed had a purity of 97.5+, and a total of 17.54 mols of butadiene was fed. The run proceeded as follows.

| Reaction time, minutes: | Reaction temperature, ° C. |
|---|---|
| 0 | 70 |
| 25 | 78 |
| 100 | 83 |
| 175 | 83 |
| 205 | 92 |
| 250 | 105 |
| 295 | 110 |

The cis-4-cyclohexene-1,2-dicarboxylic acid anhydride product was a white crystalline powder with a freezing point of 101.05° C. and the yield was 99.5 percent of theoretical.

Example 2

The procedure of Example 1 was repeated with 9.55 mols of maleic anhydride being charged initially, and a total of 12.0 mols of butadiene was fed. The average feed rate of butadiene was about .06 mol per minute, and was fed at an average rate of .021 mol of butadiene per mols of maleic anhydride per degree centigrade rise in temperature. The run proceeded as follows.

| Reaction time, minutes: | Reaction temperature, ° C. |
|---|---|
| 0 | 60 |
| 65 | 78 |
| 95 | 81 |
| 125 | 95 |
| 155 | 103 |
| 180 | 103 |
| 195 | 120 |

Cis-4-cyclohexene-1,2-dicarboxylic acid anhydride was produced at a yield of 97.3 percent of theoretical and the product had a freezing point of 100.4° C. and a Hazen color of 20.

Example 3

The procedure of Example 1 was repeated with 16.5 mols of maleic anhydride being charged originally and a total of 17.4 mols of butadiene was fed during the run. The average feed rate was about .06 mol of butadiene per minute and the feed rate amounted to an average of .023 mol of butadiene fed per mol of maleic anhydride per degree centigrade rise in temperature. The reaction proceeded as follows.

| Reaction time, minutes: | Reaction temperature, ° C. |
|---|---|
| 0 | 69 |
| 30 | 82 |
| 90 | 88 |
| 150 | 97 |
| 180 | 104 |
| 210 | 108 |
| 240 | 109 |
| 260 | 109 |
| 275 | 115 |

Cis-4-cyclohexene-1,2-dicarboxylic acid anhydride was produced at a yield of 98.5 percent of theoretical and the product had a freezing point of 100.7° C. and had a Hazen color of 15.

We claim:

1. A process for the preparation of cis-4-cyclohexene-1,2-dicarboxylic acid anhydride which comprises feeding butadiene-1,3 as a gas to the vapor phase of a reactor containing agitated, molten maleic anhydride, said butadiene-1,3 being fed at an average rate of about .01 to 0.1 mol of butadiene-1,3 per mol of maleic anhydride initially present in the reactor per ° C. rise in reactor temperature.

2. A process for the preparation of cis-4-cyclohexene-1,2-dicarboxylic acid anhydride which comprises feeding butadiene-1,3 as a gas to the vapor phase of a reactor containing agitated, molten maleic anhydride, said butadiene-1,3 being fed at an average rate of about .01 to 0.1 mol of butadiene-1,3 per mol of maleic anhydride initially present in the reactor per ° C. rise in reactor temperature, said molten maleic anhydride being at a temperature of about 53° C. to 75° C. when the feed of butadiene-1,3 is initiated and the reaction mass being at a temperature of between about 100° C. and 125° C. when the feed of butadiene-1,3 is completed.

3. A process for the preparation of cis-4-cyclohexene-1,2-dicarboxylic acid anhydride which comprises feeding butadiene-1,3 as a gas to the vapor phase of a reactor containing agitated, molten maleic anhydride in the absence of a solvent, said butadiene-1,3 being fed at an average rate of about .01 to 0.1 mol of butadiene-1,3 per mol of maleic anhydride initially present in the reactor per ° C. rise in reactor temperature, said cis-4-cyclohexene-1,2-dicarboxylic acid anhydride having a purity of at least 99 weight percent and having a color value of about 10 to 30 Hazen units.

4. A process for the preparation of cis-4-cyclohexene-1,2-dicarboxylic acid anhydride which comprises feeding butadiene-1,3 as a gas to the vapor phase of a reactor containing agitated, molten maleic anhydride, said butadiene-1,3 being fed at an average rate of about .01 to 0.1 mol of butadiene per mol of maleic anhydride initially present in the reactor per ° C. rise in reactor temperature, said reactor being purged with an inert gas during the run.

No references cited.